United States Patent [19]
Tsukada et al.

[11] Patent Number: 5,773,728
[45] Date of Patent: Jun. 30, 1998

[54] FORCE TRANSDUCER AND METHOD OF FABRICATION THEREOF

[75] Inventors: Kouji Tsukada, Seto; Takeshi Morikawa, Kasugai; Yutaka Nonomura, Nagoya; Sanae Tokumitsu; Masaharu Takeuchi, both of Owariasahi; Kazuyoshi Kawaguchi, Nagoya, all of Japan

[73] Assignee: Kabushiki Kaisha Toyota Chuo Kenkyusho, Aichi-ken, Japan

[21] Appl. No.: 625,528

[22] Filed: Mar. 29, 1996

[30] Foreign Application Priority Data

Mar. 31, 1995 [JP] Japan .................................. 7-099683

[51] Int. Cl.$^6$ ........................................................ G01L 1/16
[52] U.S. Cl. ................................ 73/862.68; 73/862.627; 73/862.632; 338/5
[58] Field of Search ................... 73/862.625, 862.627, 73/862.632, 862.68, 862.045, 726; 29/621.1; 338/5, 47; 216/11, 13, 52, 72, 79, 99; 437/74–78

[56] References Cited

U.S. PATENT DOCUMENTS

| | | | |
|---|---|---|---|
| 3,922,075 | 11/1975 | Yerman .................................... | 338/5 X |
| 4,065,970 | 1/1978 | Wilner . | |
| 4,454,771 | 6/1984 | Shimazoe et al. . | |
| 4,456,901 | 6/1984 | Kurtz et al. . | |
| 4,498,229 | 2/1985 | Wilner . | |
| 4,510,671 | 4/1985 | Kurtz et al. . | |
| 4,605,919 | 8/1986 | Wilner . | |
| 4,680,606 | 7/1987 | Knutti et al. ..................... | 73/862.68 X |
| 4,689,600 | 8/1987 | Wilner . | |
| 4,737,473 | 4/1988 | Wilner . | |
| 4,793,194 | 12/1988 | Wilner . | |
| 4,833,929 | 5/1989 | Omura et al. . | |
| 4,993,266 | 2/1991 | Omura et al. . | |
| 5,329,271 | 7/1994 | Inuzuka et al. ......................... | 338/5 X |
| 5,341,688 | 8/1994 | Morikawa et al. . | |
| 5,349,873 | 9/1994 | Omura et al. ........................ | 73/862.68 |

FOREIGN PATENT DOCUMENTS

| | | |
|---|---|---|
| 0 352 773 | 1/1990 | European Pat. Off. . |
| 44 19 138 | 12/1994 | Germany . |
| 2 207 804 | 2/1989 | United Kingdom . |
| WO 92/15851 | 9/1992 | WIPO . |

*Primary Examiner*—Elizabeth L. Dougherty
*Attorney, Agent, or Firm*—Oblon, Spivak, McClelland, Maier & Neustadt, P.C.

[57] ABSTRACT the present invention provides a force transducer having high compression fracture strength and high detection sensitivity, thus satisfying both detection precision and reliability, and also a method of fabricating such a force transducer. The force transducer is so constructed that a compression force is transferred via a pressure transfer block to narrow strain gages, which protrude from the surface of a silicon substrate and provide a small pressure-bearing area. Therefore, large compression strains act on the strain gages and thus the detection sensitivity is increased. When the compression force exceeds a predetermined value, the pressure transfer block comes into contact with the surface of the silicon crystal, thus improving the fracture strength of the strain gages. These narrow, protruding strain gages can be fabricated easily by a single mesa etching process.

23 Claims, 20 Drawing Sheets

FIG. 11A
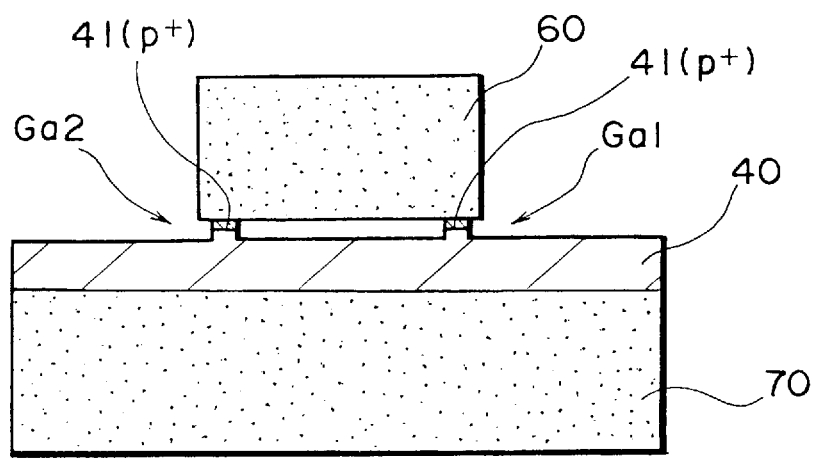
FIG. 11B
FIG. 11C
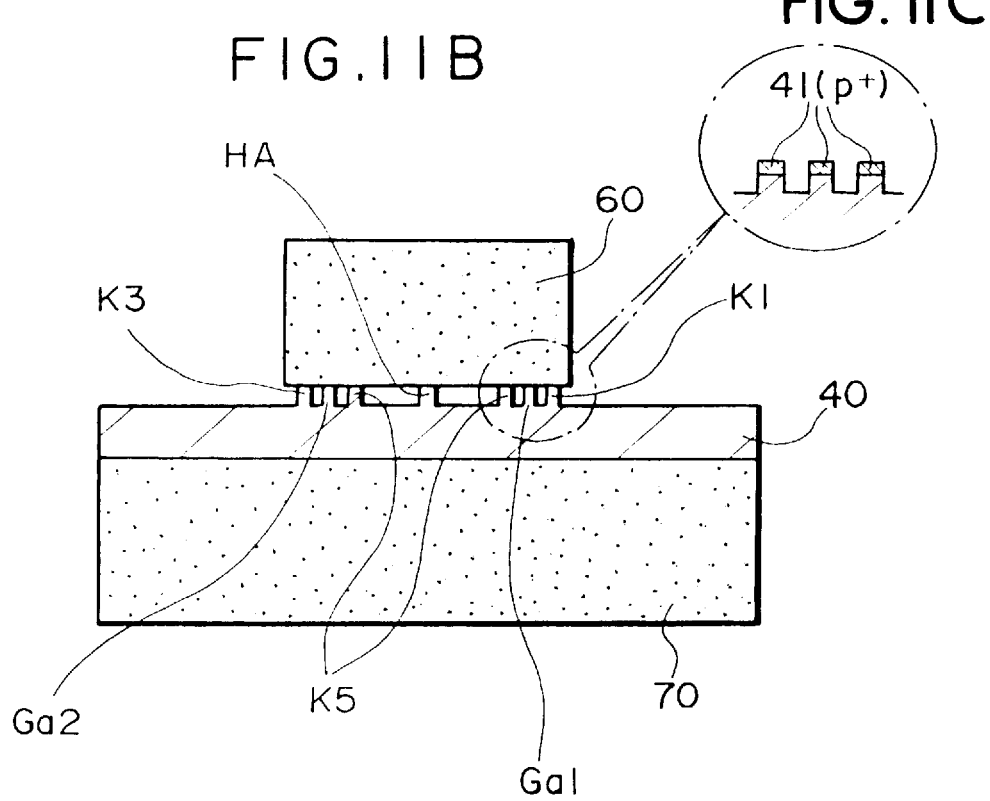

D1 : Characteristic of configuration of Fig.1

D2 : Characteristic of configuration of Fig.9

★ : Fracture point

FORCE TRANSDUCER AND METHOD OF FABRICATION THEREOF

BACKGROUND OF THE INVENTION

This invention relates to a force transducer that converts a compression force into an electrical signal, and, in particular, to a force transducer that makes use of the piezoresistive effect of a semiconductor. When a force transducer is used for measuring combustion pressures within a cylinder of an engine, that force transducer is required to have a high compression fracture strength and a high output level, in order to enable accurate control over the engine.

An example of a force transducer (taken from U.S. Pat. No. 4,833,929) is shown in FIGS. 20A and 20B, where FIG. 20A is a plan view and FIG. 20B is a cross-sectional view thereof. This force transducer comprises a rectangular p-type silicon semiconductor 10 having a (110) crystal face 10a to which a compression force W is applied, a pressure transfer block 30 connected to the crystal face 10a of the silicon semiconductor 10 and transferring the compression force (indicated by W in the figure) perpendicularly to the crystal face 10a, and a support base 20.

The pressure of the combustion gases within the engine cylinder are applied as a compression force perpendicularly to the pressure transfer block 30, via a diaphragm. If it is assumed that A is the pressure-bearing surface area of the diaphragm, P is the pressure, and a is the pressure conversion efficiency of the diaphragm, the compression force W is given by: $W = P \times A \times a$ The silicon semiconductor 10 is also provided with a pair of input electrodes 14 and 14' that oppose one another in a direction at 45° counterclockwise from the <110> crystal direction of the silicon semiconductor 10, and a current flows through the silicon semiconductor 10 between these input electrodes 14 and 14'.

Another pair of electrodes 12 and 12' are provided on the silicon semiconductor 10, opposing one another in a direction at 45° counterclockwise from the <001> crystal direction. When the compression force W acts perpendicularly on the crystal face 10a of the silicon semiconductor 10, a voltage corresponding to the compression force W is output from the pair of electrodes 12 and 12', due to the piezoresistive effect of the silicon semiconductor.

Therefore, the compression force W and thus the pressure P of the combustion gases can be measured by measuring this output voltage.

In other words, when a compression force W has been applied via the pressure transfer block 30 to the crystal face 10a of the silicon semiconductor 10, a voltage $\Delta V$ given by the following formula is generated between the electrodes 12 and 12':

$$\Delta V = I \times R \times \pi_{63} \times \sigma_z = V \times \pi_{63} \times \sigma_z \quad (1)$$

where:
- I: Current flowing through silicon semiconductor (A)
- R: Resistance between input electrodes ($\pi$)
- V: Voltage applied to silicon semiconductor (V)
- $\pi_{63}$: Piezoresistive coefficient of silicon semiconductor in configuration of FIG. 20 (cm²/kg)
- $\sigma_z$: Compression stress acting on crystal face 10a (kg/cm²)

Note that the piezoresistive coefficient $\pi_{63}$ is expressed by Formula (2) below. For more details, refer to "Use of Piezoresistive Materials in the Measurement of Displacement, Force, and Torque," The Journal of the Acoustical Society of America, Vol. 29, No. 10, October 1957. If p-type silicon having a resistivity of approximately 8 $\Omega$-cm is used, for example, the piezoresistive coefficient $\pi_{63}$ will be approximately $33 \times 10^{-6}$ cm²/kg.

$$\pi_{63} \approx 1/4(\pi_{11} - \pi_{12} - \pi_{44}) \quad (2)$$

In this formula, $\pi_{11}$, $\pi_{12}$, and $\pi_{44}$ are the piezoresistive coefficients of a cubic crystal. For p-type silicon having a resistivity of approximately 8 $\Omega$cm, $\pi_{11} = 6 \times 10^{-6}$ cm²/kg, $\pi_{12} = 1 \times 10^{-6}$ cm²/kg, and $\pi_{44} = 44 = 138 \times 10^{-6}$ cm²/kg.

The present inventors have performed further research based on the above described technology of force transducers, and, as a result, have determined the following problems with this technology:

1. There is a trade-off between a high level of sensitivity (high-level output) and compression fracture strength in such a force transducer, so that there is a natural limit to the sensitivity from the reliability point of view.

When such a force transducer is used as a combustion pressure sensor for an automobile, it must function in a rigorous environment and therefore it is important that the force transducer never fails. Thus, priority must be placed on the reliability of the force transducer in the load region, even at the expense of sensitivity. This means that it would be difficult to achieve any great improvement in sensitivity.

2. When this force transducer is mounted in an automobile, it is important to compensate the output of the force transducer to allow for changes in temperature.

Theoretically, an effective method of applying temperature compensation to the output of the force transducer is to ensure that the input resistance of the force transducer has a temperature characteristic that is the inverse of that of the detection output, to cancel any change in the characteristics of the detection output. To provide such a beneficial temperature characteristic for the resistance, it is necessary to use high-density doping of an impurity into the semiconductor single crystal that constitutes the force transducer.

However, if an impurity is doped at a high density into a semiconductor single crystal, the input resistance of the resultant force transducer is reduced and the value of the piezoresistive coefficient $\pi_{63}$ that is used in conventional force transducers also drops. This greatly reduces the detection output (the magnitude of the voltage) of the force transducer, worsening the signal-to-noise ratio and thus making implementation of this method impracticable.

Therefore, before the advent of this invention, it was difficult to implement this technique of using high-density impurity doping to compensate the temperature characteristics.

SUMMARY OF THE INVENTON

An objective of the present invention is to provide a force transducer having high compression fracture strength and high detection sensitivity, thus satisfying both detection precision and reliability. The invention also provides a method of fabricating such a force transducer.

A force transducer of present invention comprising A silicon single crystal substrate having a {110} crystal face as a surface to which a compression force is applied, and a pressure transfer block for transferring the compression force to the silicon single crystal substrate, and strain gages provided on the silicon single crystal substrate, the strain gages being formed so as to protrude from the {110} crystal face of the silicon single crystal and constituted as a bridge circuit composed of two pairs of opposing strain gages, the electrical resistance of the strain gages being changed by the compression force transferred by the pressure transfer block.

The force transducer in accordance with this invention is preferably configured in such a manner that a compression force of a pressure transfer block acts on narrow strain gages protruding from a surface of a silicon substrate. This configuration differs from that of a conventional force transducer in which the compression force acts on a single crystal surface, in that the area on which the pressure acts is much smaller, and thus a large compression strain is generated in the strain gages, increasing the detection sensitivity.

This configuration may use the piezoresistive coefficient $\pi_{13}$, which has a sensitivity that is at a maximum in the <110> direction of the (110) surface of silicon single crystal, thus enabling the use of a novel configuration of the standard bridge construction.

This invention is further characterized in that the amount of protuberance of the strain gages (their height of protrusion) is preferably such that, if the compression force exceeds a predetermined value, the deformation caused by that compression force will bring part of the pressure transfer block into contact with the surface of the silicon crystal.

This ensures that the pressure transfer block comes into contact with the surface of the silicon crystal if the compression force is too large, so that the surface of the silicon crystal will bear part of the compression strain. Therefore the stress acting on the strain gages is distributed, improving the fracture strength of the strain gages.

A silicon single crystal doped with a high density of an impurity is preferably used in the force transducer of the present invention. This makes it possible to suppress any change in characteristics of the force transducer due to changes in temperature. Since narrow, protuberant strain gages are used in the force transducer of this invention, their cross-sectional area is small and thus the resistance of these strain gages can be increased. Therefore, it is possible to guarantee an input resistance of approximately 1 kΩ as the resistance of these strain gages, despite the above described problems caused by a high impurity density in a silicon single crystal, and thus it is possible to fabricate strain gages that are sufficiently sturdy for practical use.

The force transducer of this invention is also preferably provided with "guard banks" on either side of the strain gages. These guard banks are formed to protrude from the surface of the silicon single crystal to the same degree as the strain gages and are electrically insulated therefrom. The guard banks always bear the compression forces, and they also bear any horizontal component of force that might be generated by deformation of the pressure transfer block by the compression forces, so that they function to reduce such horizontal components of force acting on the strain gages. This further improves the fracture strength of the force transducer.

In a method of fabricating a force transducer in accordance with this invention, narrow, protuberant strain gages are preferably formed by batch mesa etching of a semiconductor substrate. This enables protuberant strain gages to be formed by a simple process.

The method of fabricating a force transducer in accordance with this invention preferably uses a silicon-on-insulator (SOI) substrate. This makes it possible to form strain gages that can be used at high temperatures of 200° C. or above, by a simple process.

The present invention makes it possible to fabricate a force transducer which has a high reliability and also a sensitivity eight times as high as that of a conventional force transducer. Therefore it is likely that there will be no need to provide an amplifier to amplify the sensor output when the sensor is used in a combustion pressure sensor. If an amplifier occupying approximately ⅓ the price of the entire sensor can be omitted, it will make it easier to reduce the cost of the combustion pressure sensor.

Table 1 shows the crystal faces equivalent to the crystal face of (110) and the directions of crystallization equivalent to the directions of [001] and [1$\bar{1}$0], respectively, of the Si single crystal. A crystal face equivalent to the crystal face of (110) is represented by {110} and the directions quivalent to the directions of [001] and [1$\bar{1}$0] are represented by <001> and <110>, respectively.

TABLE 1

| Crystal face | Direction of crystallization | Direction of crystallization |
| --- | --- | --- |
| (110) | [001] | [1$\bar{1}$0] |
| (1$\bar{1}$0) | [001] | [110] |
| ($\bar{1}$10) | [001] | [110] |
| ($\bar{1}$$\bar{1}$0) | [001] | [110] |
| (101) | [010] | [10$\bar{1}$] |
| (10$\bar{1}$) | [010] | [10$\bar{1}$] |
| ($\bar{1}$0$\bar{1}$) | [010] | [101] |
| ($\bar{1}$01) | [010] | [101] |
| (011) | [100] | [01$\bar{1}$] |
| (01$\bar{1}$) | [100] | [01$\bar{1}$] |
| (0$\bar{1}$$\bar{1}$) | [100] | [011] |
| (0$\bar{1}$1) | [100] | [011] |

BRIEF DESCRIPTION OF THE DRAWINGS

FIG. 11A is a cross-sectional view of a force transducer in a comparative example, illustrating the action and effect of the guard banks and the central protuberant portion in the force transducer, and FIGS. 11B and 11C are cross-sectional views through the embodiment of FIG. 9;

DESCRIPTION OF THE PREFERRED EMBODIMENTS

Embodiments of this invention will be described below with reference to the accompanying figures.

Embodiment 1

Overall Configuration

Figure 1:
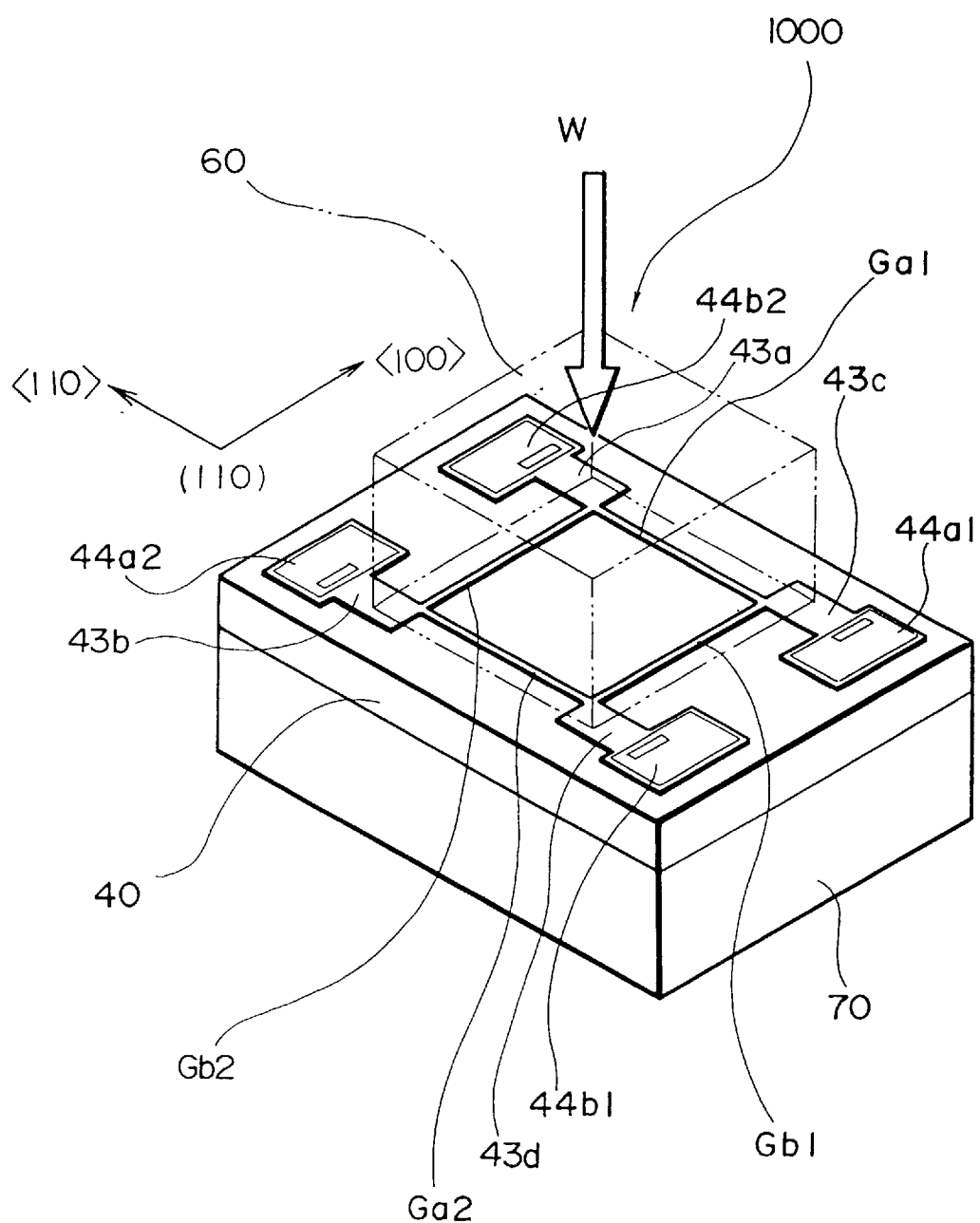
FIG. 1 is a perspective view of the force transducer in a first embodiment of this invention.

A force transducer 1000 in accordance with a first embodiment of this invention is shown in perspective view in FIG. 1.

The force transducer 1000 comprises a block of silicon single crystal 40 with a (110) surface, a pressure transfer block 60 made of crystallized glass, and a base 70, all of these components being fixed together by electrostatic bonding.

The silicon single crystal 40 with a (110) crystal face is an n-type semiconductor with a resistivity of approximately 1 Ω-cm. This silicon single crystal 40 is machined into a rectangular block with a width of 1.4 mm, a length of 2.0 mm, and a height of 0.3 mm.

The base 70 is similarly machined into a rectangular block with a width of 1.4 mm, a length of 2.0 mm, and a height of 0.5 mm.

Four strain gages Ga1, Ga2, Gb1, and Gb2 with a width of 10 μm are formed in a full-bridge configuration on the surface of the silicon single crystal on the side of the junction between the silicon single crystal 40 and the pressure transfer block 60.

These strain gages could be formed by diffusing boron over the entire surface of an n-type semiconductor to form 0.001 Ω-cm p-type semiconductor layer (reference number 41 in FIGS. 3A and 3B), then etching this semiconductor surface to a depth of 3 μm.

The pressure transfer block 60 is a rectangular block of crystallized glass attached to the strain gages Ga1, Ga2, Gb1, and Gb2 by electrostatic bonding, with a width of 1.0 mm, a length of 1.0 mm, and a height of 0.5 mm. A compression force W that is applied to the upper surface thereof is transferred perpendicularly to the strain gages Ga1, Ga2, Gb1, and Gb2.

Configuration of Strain Gages

Figure 2:
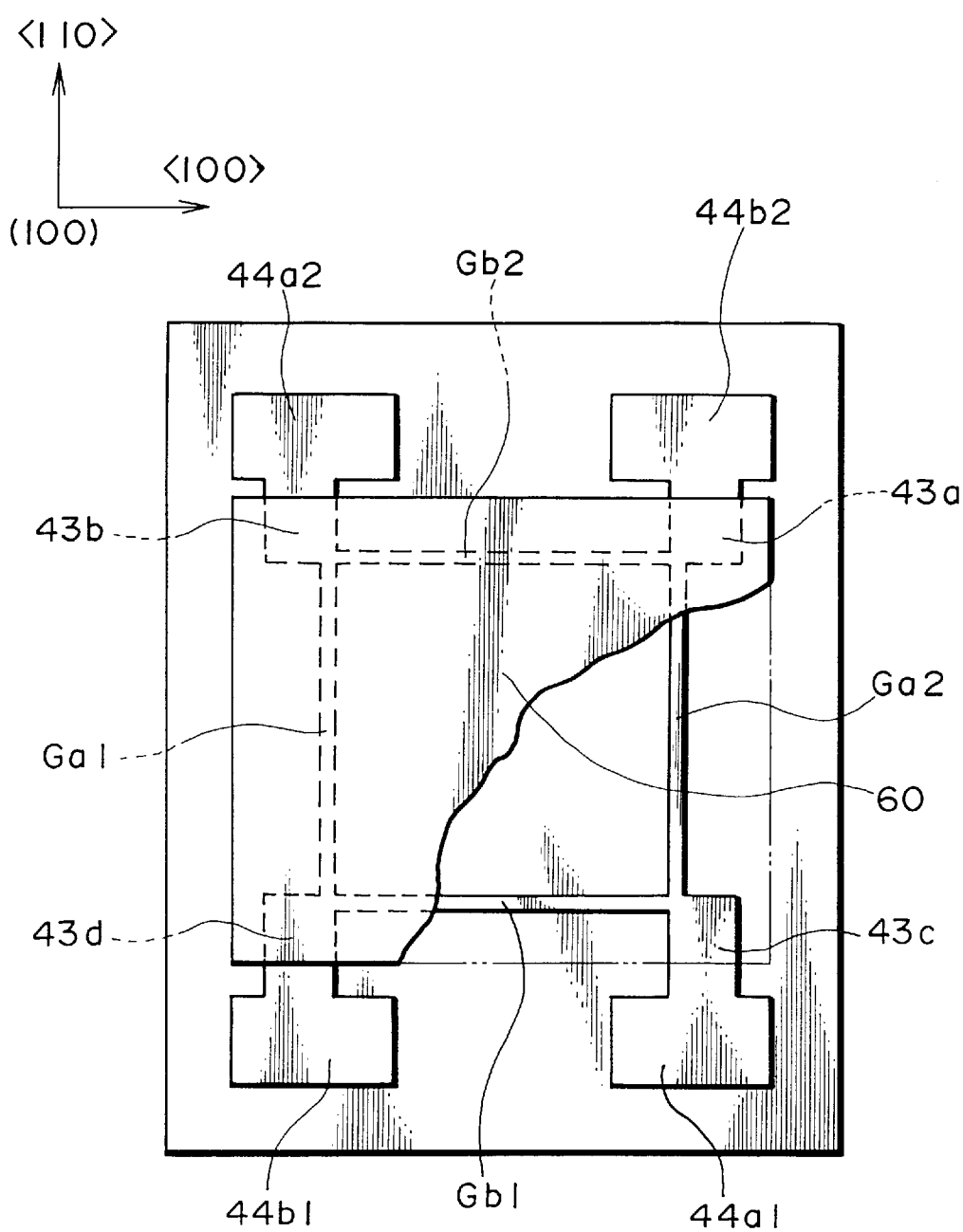
FIG. 2 is a diagram illustrating the layout of the strain gages shown in FIG. 1 and also the relationship between the strain gages and the pressure transfer block.

The longitudinal direction of one pair of mutually opposing strain gages Ga1 and Ga2 is aligned with the <110> direction of the crystal, and the longitudinal direction of the other pair of mutually opposing strain gages Gb1 and Gb2 is aligned with the <100> direction of the crystal, as shown in FIG. 2. Leads 43a to 43d protrude from the connecting portions between adjacent strain gages, and the leads 43a to 43d are connected to electrodes 44b2, 44a2, 44a1, and 44b1, respectively.

The leads 43a to 43d are formed of the same p-type semiconductor as the strain gages Ga1, Ga2, Gb1, and Gb2.

The electrodes 44a1, 44a2, 44b1, and 44b2 have a thickness of approximately 1 μm. Reference numbers 44a1 and 44a2 denote input electrodes, and reference numbers 44b1 and 44b2 denote output electrodes. If a constant current is supplied to the input electrodes, a voltage output (V) that is proportional to the compression force W acting on the pressure transfer block 60, is obtained from the output electrodes. The relationship between the voltage output V, and the compression force W and the piezoresistive coefficient $\pi_{13}$ is as follows:

$$\Delta V = V_{in} \cdot \sum_{\lambda=1}^{n} \{\pi_{13}(\sigma_3)i + \pi_{12}(\sigma_2)i + \pi_{11}(\sigma_1)i\}/(2R_1 + \Delta R_2) \qquad (3)$$

where:

R1: Resistance of strain gages in <100> direction
R2: Resistance of strain gages in <110> direction
i: One of n strain gages in <110> direction The following can be substituted for the piezoresistive coefficient $\pi_{13}$ in Formula (3):

$$\pi_{13} = 1/2(\pi_{11} + \pi_{12} - \pi_{44}) \qquad (4)$$

where:

$\pi_{12} << (\pi_{11} - \pi_{44})$

Figure 19:
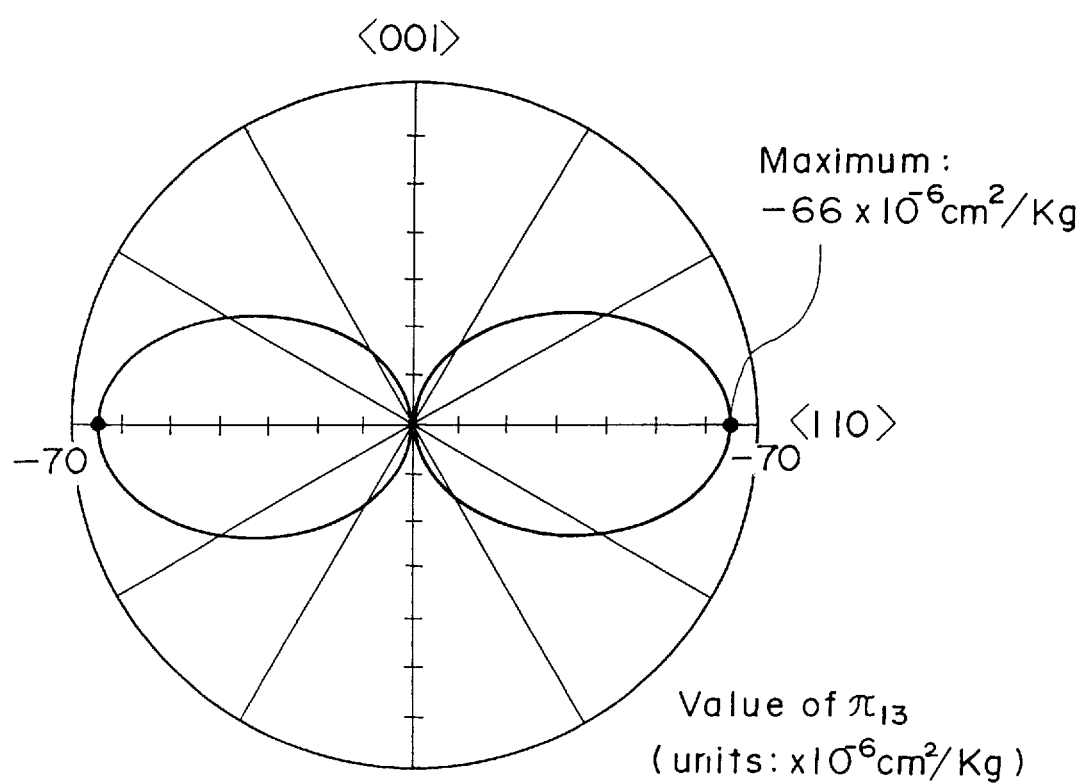
FIG. 19 is a polar graph illustrating changes in the piezoresistive coefficient $\pi_{13}$ as the direction of input-output electrodes are rotated through 360 degrees, when a compression force acts on a crystal surface where two pairs each of opposing input-output electrodes are formed on a silicon semiconductor having a (110) crystal face.
Figure 20A:
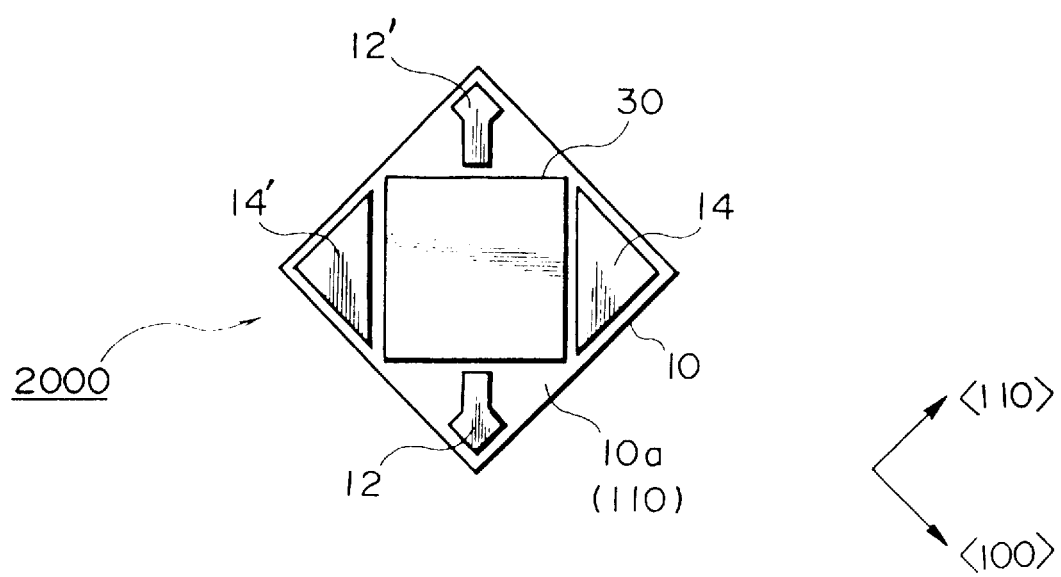
FIG. 20A is a plan view of the configuration of a force transducer that was developed by the present inventors prior to this invention.
Figure 20B:
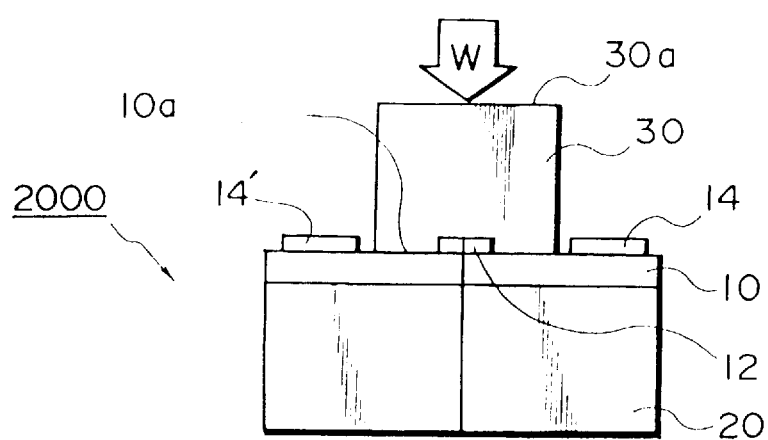
FIG. 20B is a cross-sectional view through this force transducer.

Sensitivity of the piezoresistive coefficient $\pi_{13}$ is plotted in polar coordinates in FIG. 19. Note that other suitable semiconductors where the piezoresistive coefficient $\pi_{13}$ can be used effectively are the (111) or (211) surface of a p-type semiconductor or the (111) or (211) surface of an n-type semiconductor.

Structure of Combustion Pressure Sensor

Figure 13:
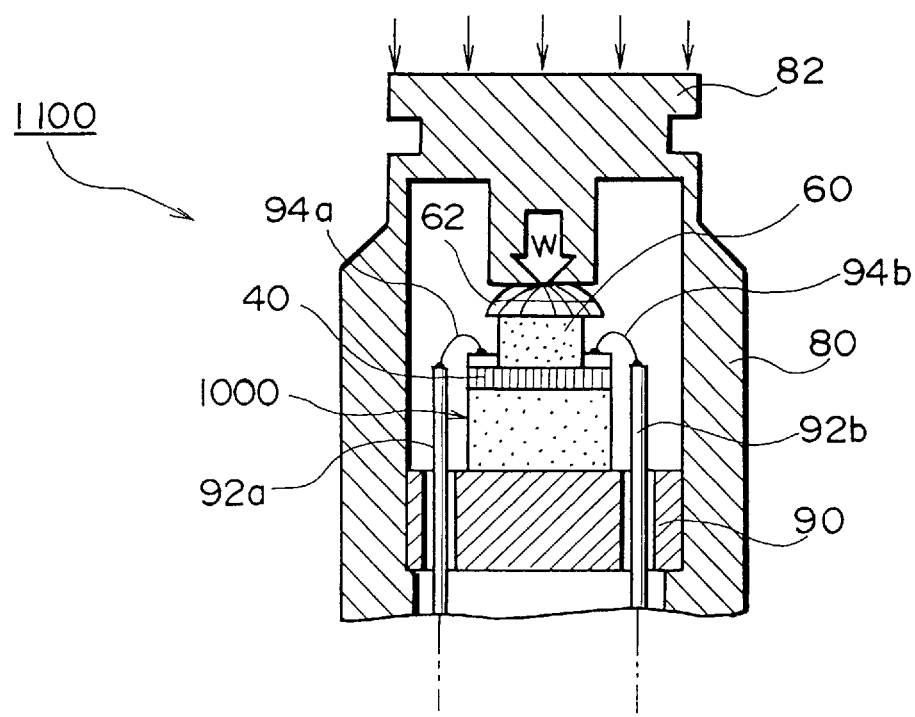
FIG. 13 is a cross-sectional view of essential components of a combustion pressure sensor configured by using the force transducer of this invention.

In FIG. 13, a combustion pressure sensor 1100 in which the force transducer 1000 of this embodiment is used as a pressure detection means is shown.

This combustion pressure sensor 1100 comprises a cylindrical housing 80 provided with a metal diaphragm 82, and the force transducer 1000 fixed within this housing 80.

The housing 80 is attached to a wall surface of an engine cylinder head (not shown in the figure) and is formed in such a manner that the pressure P within the cylinder acts on the metal diaphragm 82.

The force transducer 1000 is fixed within the housing 80 by a sealed terminal 90, and a top portion 62 of the pressure transfer block 60 is formed in a dome shape and is in contact with the rear surface of the metal diaphragm 82.

This configuration ensures that the pressure P within the cylinder is converted into the compression force W by the metal diaphragm 82, this compression force W is transferred to the top portion 62 of the pressure transfer block 60 constituting the force transducer 1000, then finally acts as compression strains in the (110) crystal face of the silicon semiconductor shown in FIG. 1.

The sealed terminal 90 is provided with lead pins 92a, 92b, 92c, and 92d (note that only 92a and 92b are shown in FIG. 13). These lead pins 92a, 92b, 92c, and 92d are electrically connected to the electrodes 44a1, 44a2, 44b1, 44b2 of the force transducer 1000 by bonding wires 94a, 94b, etc., of a diameter of 50 μm.

When the pressure P within the cylinder acts on the diaphragm 82 of the combustion pressure sensor 1100, this pressure P is transferred to the force transducer 1000 as a compression force W, and is converted into a voltage output ΔV on the basis of the piezoresistive effect of the silicon single crystal 40, as shown in Formula 4.

This result is completely unaffected by external factors, enabling accurate measurement of the pressure P within the cylinder.

Description of Piezoresistive Coefficient $\pi_{13}$

The configuration of this embodiment uses the piezoresistive coefficient $\pi_{13}$ that has a maximum sensitivity in the <110> direction on the (110) surface of a silicon single crystal, to make it possible to implement the use of a novel configuration that forms a bridge.

Figure 18A:
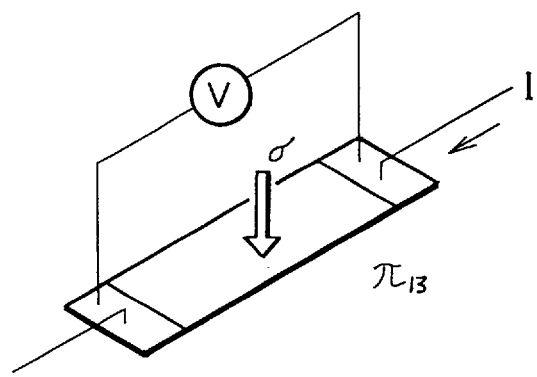
FIGS. 18A, 18B, and 18C illustrate different piezoresistive coefficients.

The piezoresistive coefficient $\pi_{13}$ refers to the piezoresistive coefficient used when the voltage-detection direction and the current-flow direction are the same, and a uniaxial stress acts in a direction perpendicular thereto, as shown in FIG. 18A.

Figure 18B:
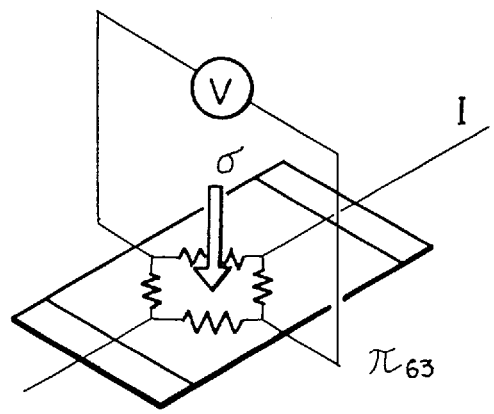
Figure 18C:
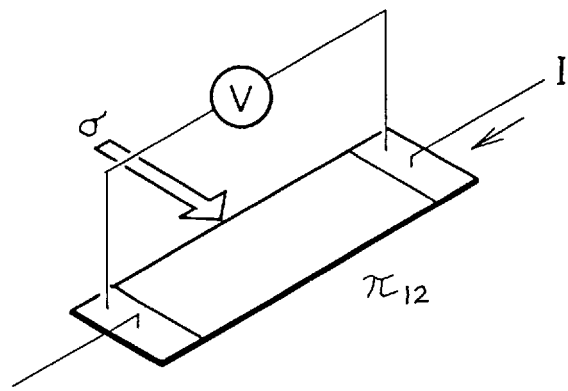

Incidentally, the piezoresistive coefficient $\pi_{63}$ used in the conventional configuration refers to the piezoresistive coefficient used when the voltage-detection direction and current-flow direction cross, and a uniaxial stress acts in a direction perpendicular to both of these directions, as shown in FIG. 18B. The piezoresistive coefficient $\pi_{12}$ is the piezoresistive coefficient used when the voltage-detection direction and the current-flow direction are the same, and a uniaxial stress acts in the horizontal direction perpendicular thereto, as shown in FIG. 18C.

The piezoresistive coefficient $\pi_{13}$ has a sensitivity that is at a maximum in the <110> direction on the (110) surface, but is zero in the <100> direction, as shown in FIG. 19. Therefore, if strain gages are disposed in the directions to form a Whetstone bridge, an output that is equivalent to that of a half bridge can be obtained with a full-bridge configuration.

Characteristic Features of this Embodiment

Figure 3A:
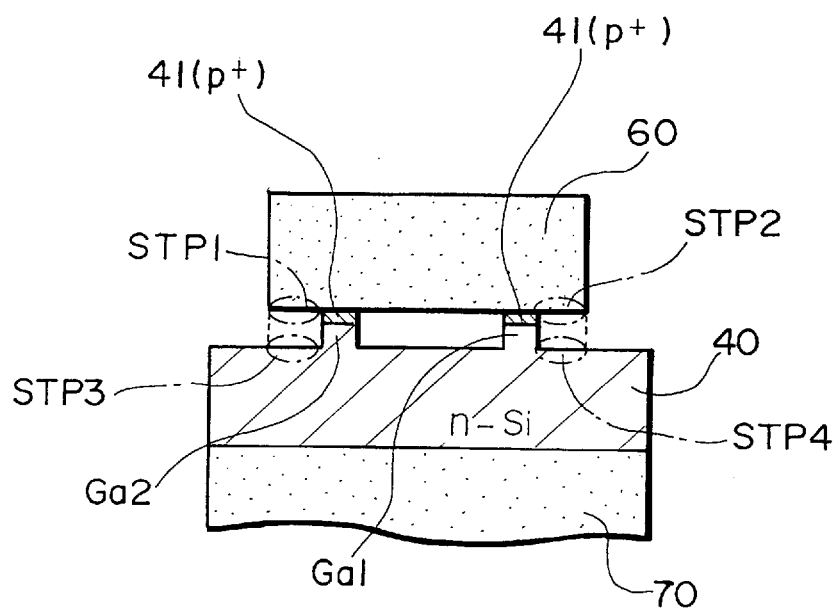
FIG. 3A is a cross-sectional view of the force transducer when no compression force is applied thereto and FIG. 3B is a cross-sectional view of the force transducer when a compression force is applied thereto.

A. A characteristic feature of this embodiment is that the strain gages are formed as narrow strain gages protruding from the semiconductor substrate as shown in FIG. 3A. Note that only two strain gages Ga1 and Ga2 are shown in this figure.

This configuration ensures that the pressure-bearing area of the strain gages is markedly smaller than in conventional configurations in which the compression force acts over the entire surface of the substrate, so that a larger compression strain acts on each strain gage, increasing the detection sensitivity.

In other words, if it is assumed that A is the pressure-bearing surface area of the diaphragm and a is the pressure conversion efficiency, which is the ratio of the force borne by the fixed portion of the diaphragm and the force acting as the compression force W, the compression force W is given by:

$$W = P \times A \times a \qquad (5)$$

The detection output of this force transducer is proportional to the product of the piezoresistive coefficient and the stress. Therefore, an effective way of increasing the stress acting on the detector portion is to reduce the pressure-bearing area of the detector portion.

Figure 3B:
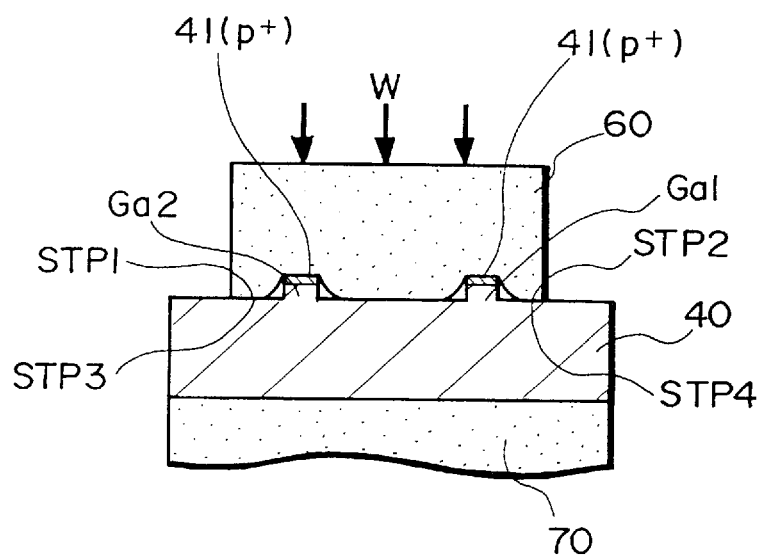

B. Another characteristic feature of this embodiment is that the height of protrusion of the strain gages can be adjusted to ensure that, when the load exceeds a predetermined value, stopper regions STP1 to STP4 come into mutual contact as shown in FIG. 3B to act as stoppers and thus distribute the compression force W.

In other words, if the compression force increases enough that the pressure transfer block 60 deforms (bends), part of the lower surface of the pressure transfer block 60 comes into contact with the surface of the semiconductor single crystal. So stoppers are formed by this contact region, and these stoppers bear the compression force to distribute the stress acting on the strain gages.

The action of these stoppers distributes the compression force acting on the narrow, three-dimensional strain gages, thus improving their fracture strength. The height of protrusion of the strain gages is preferably between 1 μm and 3 μm.

Note that part of the lower surface of the pressure transfer block 60 and part of the surface of the n-type silicon substrate act as the above described stopper region.

Figure 6:
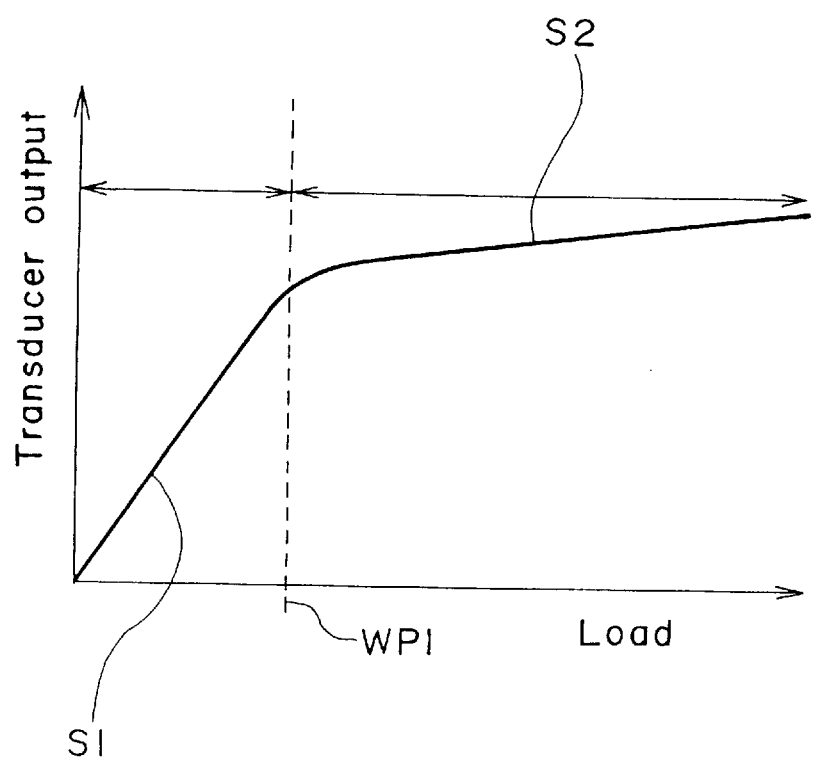
FIG. 6 is a graph of the relationship between load on the force transducer of FIG. 1 and the output voltage thereof.

The output characteristics of the sensor of this embodiment are shown in FIG. 6. A high-sensitivity characteristic S1 is the characteristic obtained when the stopper is not operated, and a low-sensitivity characteristic S2 is that obtained when the stopper is operated. In this figure, the load at which the stopper starts to act is indicated by WP1.

Figure 12:
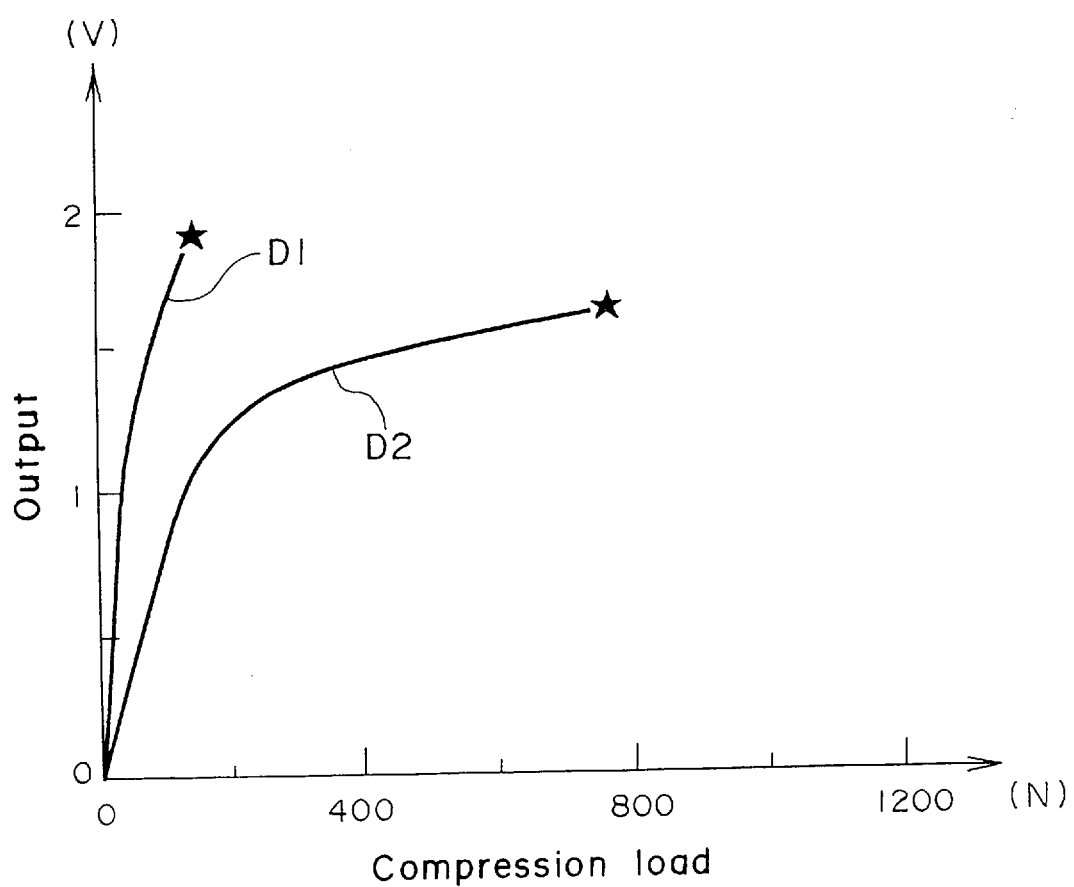
FIG. 12 is a graph showing the fracture strengths of the embodiments of FIGS. 1 and 9.

The characteristic of output with respect to compression load of the sensor of this embodiment is shown in FIG. 12. A curve D1 is the characteristic in accordance with this embodiment.

C. A further characteristic feature of this embodiment is a configuration in which four strain gages Ga1, Ga2, Gb1, and Gb2 are disposed to form the sides of a quadrangle in a plane, as shown in FIG. 2, and the compression strain of the pressure transfer block 60 acts on each of these strain gages.

This configuration provides the following effects:

a. Effect Obtained by Disposing the Strain Gages in a Quadrangle

As described above, the pressure-bearing area of the strain gages is reduced by processing, enabling an improvement in sensor sensitivity. However, although the fracture strength of the silicon strain gages is extremely high with respect to compression forces in the perpendicular direction, it is low with respect to stresses in the horizontal direction and tension forces in the perpendicular direction. Therefore, simply reducing the pressure-bearing area makes the strain gages liable to be damaged by horizontal components of force acting along the surface of the semiconductor single crystal. Such horizontal components of force are an inevitable result of structural errors during the fabrication of force transducers.

Figure 4A:
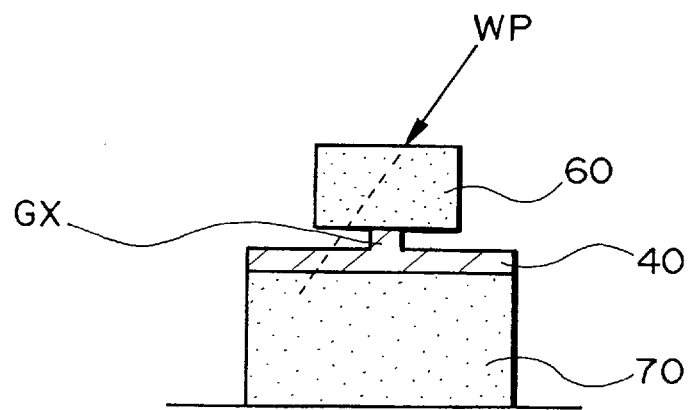
FIG. 4A is a cross-sectional view of a strain gage in a comparative example for illustrating the reason why the fracture strength is affected by the arrangement of strain gages in view of materials science.

In other words, a strain gage GX in the configuration as shown for example in FIG. 4A could easily be damaged by the torque generated by a compression force WP acting thereon in an oblique direction.

Figure 4B:
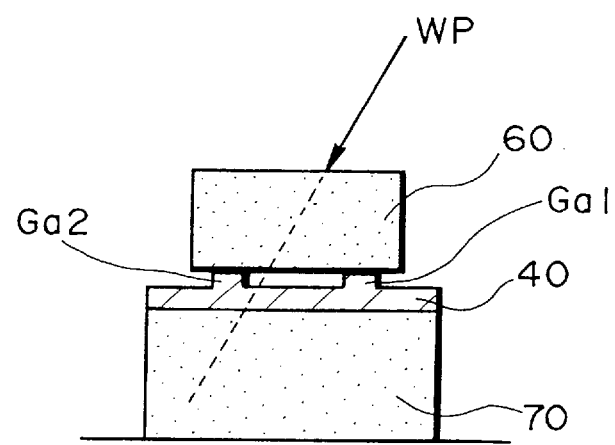
FIG. 4B is a cross-sectional view of the force transducer of FIG. 1.

To prevent this, four strain gages are disposed to configure the sides of a quadrangle, and they are positioned in such a manner that they are somewhat further inward from the outer edges of the lower surface of the pressure transfer block, as shown in FIG. 4B. This configuration ensures that a compression force WP coming from an oblique direction acts on the strain gages as an effective compression force, so that there is no peeling stress due to torque and thus the strain gages are not likely to be damaged. This further increases the fracture strength.

b. Effect Obtained by Applying a Compression Force to All Four Strain Gages by the Pressure Transfer Block As described above, when the strain gages are disposed to configure the sides of a quadrangle, the piezoresistive coefficient $\pi_{13}$ plays a particularly important role.

This piezoresistive coefficient $\pi_{13}$ has a sensitivity that is at a maximum in the <110> direction on the (110) surface, but is zero in the <100> direction. Therefore, if strain gages are disposed in the directions to form a Whetstone bridge, an output that is equivalent to that of a half bridge can be obtained with a full-bridge configuration.

Figure 5:
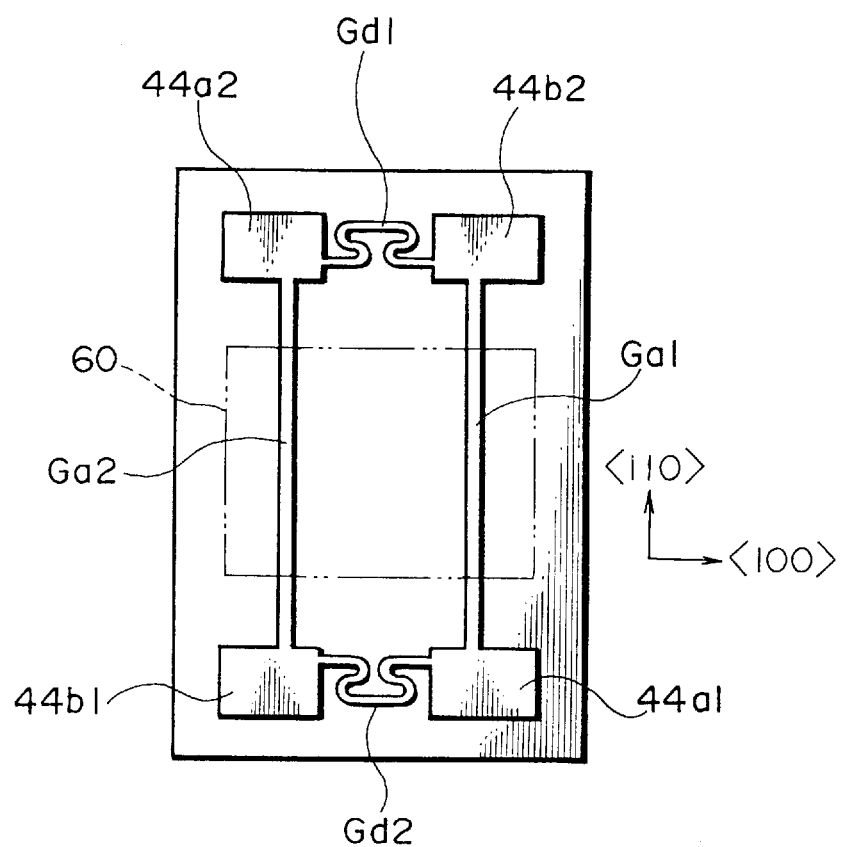
FIG. 5 is a plan view of a force transducer, illustrating the reason why detection sensitivity changes according to the mutual relationship between the strain gages and the pressure transfer block in the force transducer of FIG. 1.

However, if a layout is used such that strain gages Gd1 and Gd2 are disposed in the <100> direction in portions where no compression force acts and compression forces act only on strain gages Ga1 and Ga2 in the <110> direction, as shown by example in FIG. 5, the strain gages Ga1 and Ga2 will be subjected to not only compression forces in the effective longitudinal direction, but also small stress in the horizontal direction due to deformation of the strain gages in the horizontal direction. Therefore, the amount of change in the piezoresistive coefficient $\pi_{12}$ (see FIG. 18C) generated by the unwanted stress in the horizontal direction will be superimposed on the change in $\pi_{13}$ due to the compression force that is being measured, worsening the signal-to-noise ratio. In other words, the signal level will deteriorate and the linearity of the output will worsen.

To prevent this, if a compression force is made to act on the strain gages Gb1 and Gb2 in the <100> direction as shown in FIG. 4, the direction of the change in $\pi_{12}$ generated in these strain gages Gb1 and Gb2 is opposite to the direction of the change in $\pi_{12}$ generated in the strain gages Ga1 and Ga2 in the <110> direction by the horizontal component of force, and thus changes in the piezoresistive coefficient $\pi_{12}$ are cancelled, improving the detection sensitivity and linearity.

For the above reason, the force transducer of this embodiment does not use the configuration of FIG. 4A but has strain gages Ga1 and Ga2 disposed at portions somewhat within the outer edges of the pressure transfer block 60 to reduce stress in the horizontal direction.

The shape and position of the strain gages will now be described in detail.

The strain gages configuring the sides of a quadrangle are preferably provided in the vicinity of a neutral surface of in-plane stresses generated by the compression of the pressure transfer block. This makes it possible to balance the in-plane stresses on the strain gages on either side, moderating stresses in the in-plane direction acting on the strain gages.

In this case, "neutral surface of in-plane stresses" refers to a region in which horizontal stresses generated by the compression of the pressure transfer block act in different directions to be mutually cancelled. In effect, this is a region in which no horizontal stresses are generated.

This configuration makes it possible to guarantee symmetry of deformation caused by compression of the pressure transfer block and the resultant in-plane stresses generated by oblique pressure on the corner portions of the strain gages. In other words, in-plane stresses cancel each other out and the resultant stress within the plane is zero, so that any compression force acts on the strain gages as an effective compression force and thus horizontal peeling stresses are greatly reduced, thus making it difficult for the strain gages to become damaged. This further increases the fracture strength of the force transducer.

If the configuration is that shown in FIG. 5, in which only one pair of strain gages Ga1 and Ga2 is compressed (the other pair of strain gages Gd1 and Gd2 is not compressed), the detection output will be directly effected by piezoresistive coefficients other than $\pi_{13}$ which are due to elongation of the strain gages in the horizontal direction. Therefore, the configuration of this invention is such that all of the strain gages are compressed, as shown in FIG. 2.

This ensures that any changes in piezoresistances other than $\pi_{13}$ are cancelled, preventing them from affecting the output.

D. A still further characteristic feature of this embodiment is that force transfer provides its own temperature compensation and resistance to high temperatures by using the advantages of narrow strain gages arranged in a grid formation.

Figure 15A:
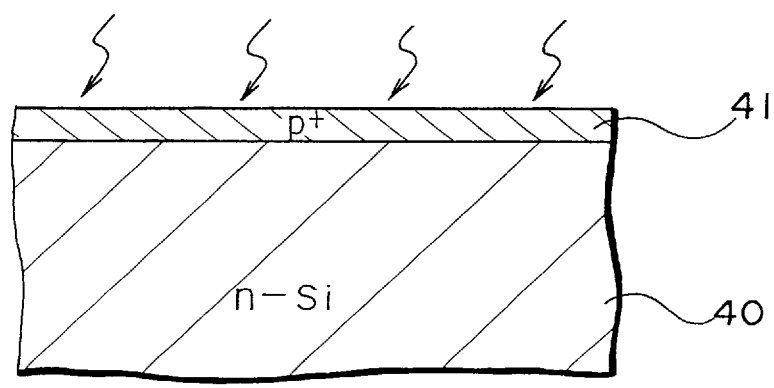
FIGS. 15A and 15B are cross-sectional views of a force transducer, illustrating one embodiment of a method of fabricating a force transducer in accordance with this invention.
Figure 15B:
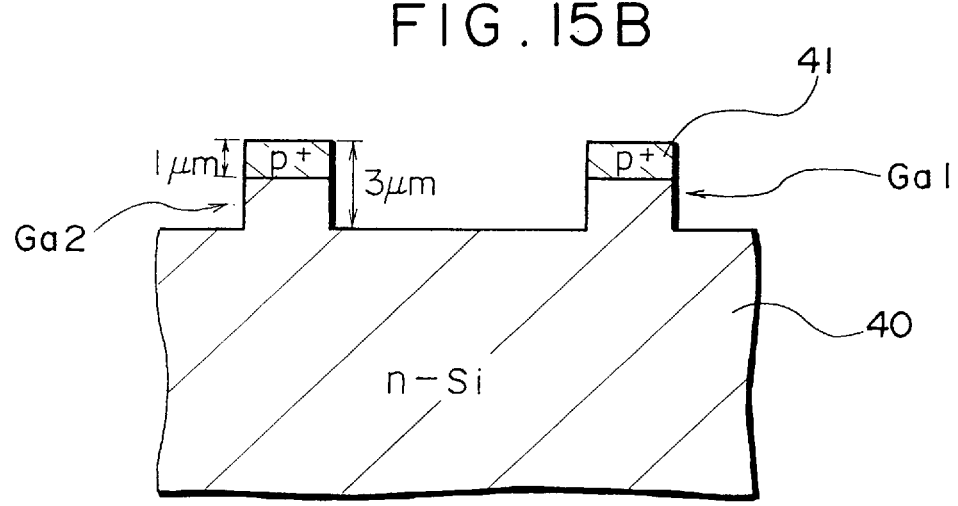

A high density of a p-type impurity is diffused into a top portion of each of the strain gages Ga1, Ga2, Gb1, and Gb2, which directly bears the compression force acting on that strain gages, as shown in FIG. 15B. This impurity density is a density of the order of a point A or a point B in FIG. 17B, which enables automatic compensation of the temperature characteristic of the sensor output. Since the cross-sectional area of each of the strain gages is small in this embodiment, an input resistance of approximately 1 kΩ can be guaranteed, even with such a high impurity density, to provide strain gages that can cope with practical usage.

The pn junctions are generated only in the strain gage portions, enabling a reduction in leakage current from the pn junction due to increasing ambient temperature. Therefore, this force transducer can be used at temperatures of at least approximately 200° C.

This temperature compensation is described in more detail below.

Figure 17A:
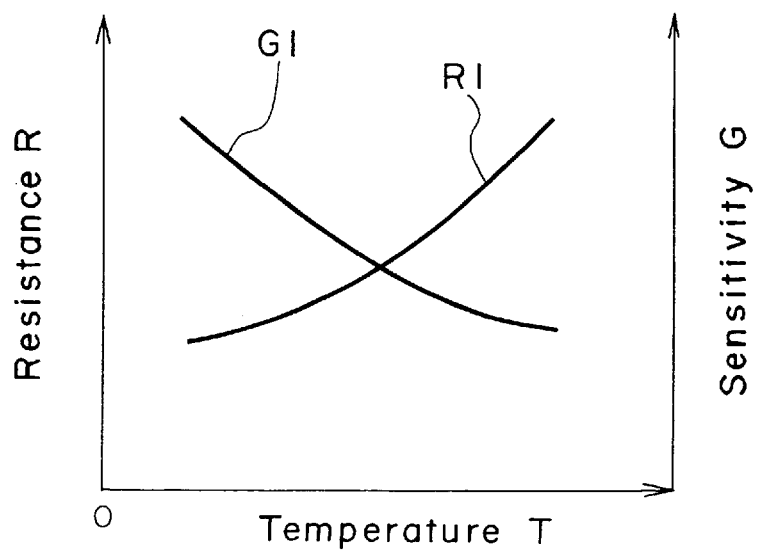
FIGS. 17A and 17B are graphs illustrating the effect of compensation on the temperature dependency of detection sensitivity in the force transducer of this invention.

While a constant voltage is being applied, the sensor sensitivity G and the resistance R of the strain gages vary with temperature T, as shown for example in FIG. 17A. The example shown in FIG. 17A relates to temperature characteristics G1 and R1.

Figure 17B:
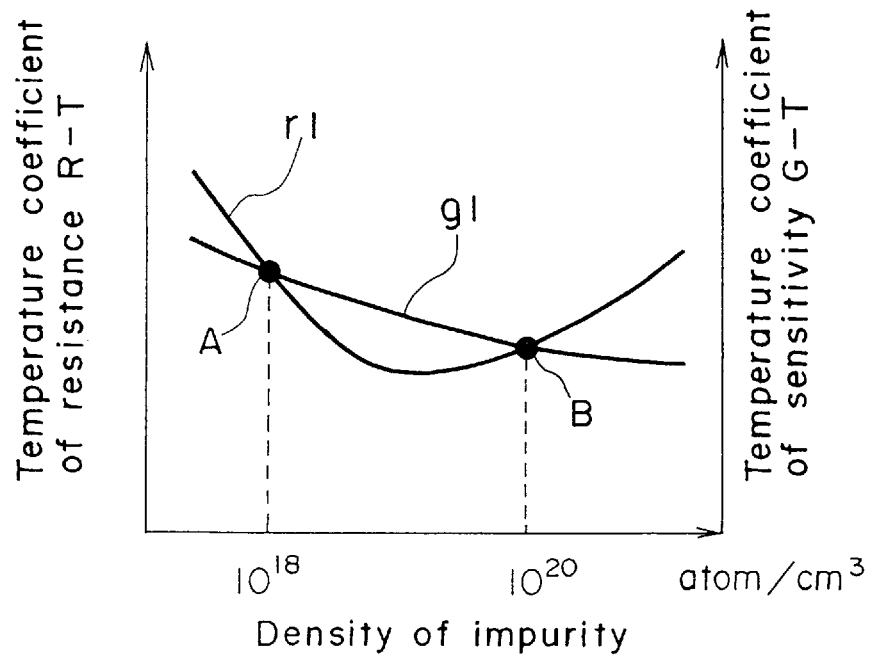

Both of these temperature characteristics vary with impurity density, as shown by characteristics r1 and g1 in FIG. 17B. This makes it possible to compensate the temperature characteristic of the sensitivity by selecting a suitable impurity density.

Assume that the input electrodes of the force transducer are driven by a constant current and the sensor sensitivity drops 20% for an increase in temperature of Δt. If the resistance of the strain gages could be increased by 20% in such a case, it is possible to compensate for the drop in sensitivity by amplifying the applied voltage to increase the bridge input voltage by 20%.

Impurity densities that enable this temperature compensation are in the vicinity of $1\times10^{18}$ atoms/cm$^3$ (point A) and $1\times10^{20}$ atoms/cm$^3$ (point B) for the p-type semiconductor as illustrated in FIG. 17B, and use of these impurity densities can greatly improve the dependency on temperature of the sensitivity.

In this case, since the present invention uses narrow, protuberant strain gages, the cross-sectional area thereof is small and thus the resistance of these strain gages has been increased. Therefore, an input resistance of approximately 1 kΩ can be guaranteed, even with such a high impurity density, to enable the fabrication of strain gages that can cope with practical usage.

The force transducer of the present invention can be improved in resistance to high temperatures, as described below.

A pn junction is inevitably formed when a strain gage is formed on the surface of an n-type semiconductor substrate and a p-type impurity is diffused therein to provide the above described temperature compensation. Since the leakage current at such a pn junction increases as the ambient temperature increases, this is a cause of worsening of the temperature characteristic.

However, in the configuration shown in FIG. 15B, the forming of deep steps by etching ensures that such pn junctions occur only within the strain gages portions of the force transducer. This ensures that leakage currents are reduced, in comparison with a configuration in which a p-type layer is formed uniformly over the surface of the semiconductor substrate, and thus provides a force transducer that can resist higher temperatures. This force transducer can be used at temperatures of at least 200° C.

Figure 16A:
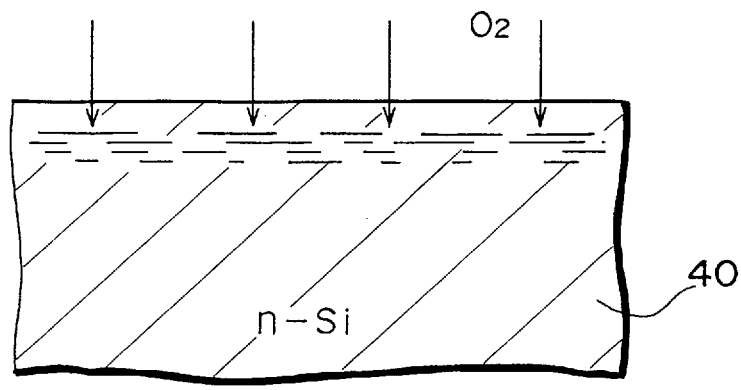
FIGS. 16A, 16B, and 16C are cross-sectional views of a force transducer, illustrating another embodiment of a method of fabricating a force transducer in accordance with this invention.
Figure 16B:
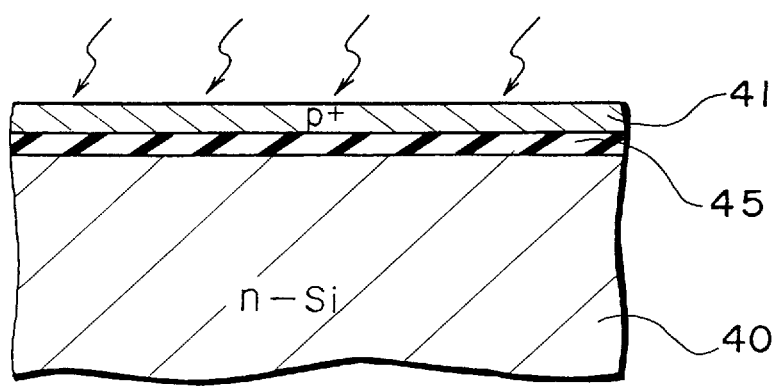
Figure 16C:
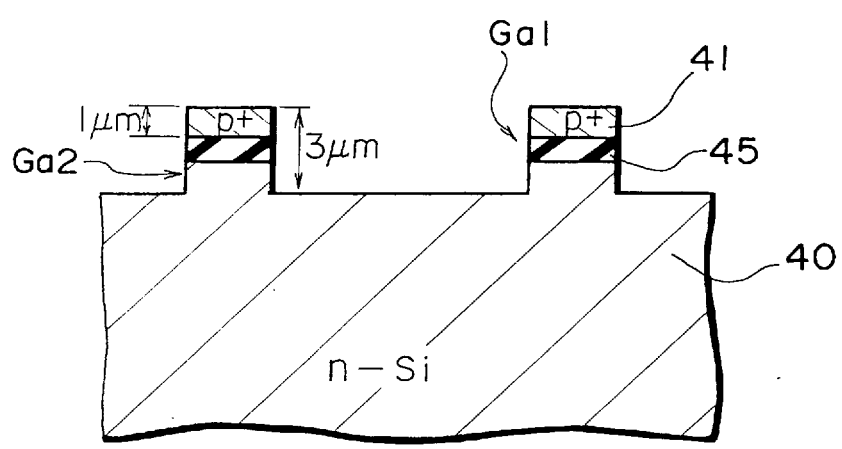

Furthermore, if the SOI structure shown in FIG. 16C is used, the presence of the insulating layer prevents pn junctions from being formed and thus a force transducer that can withstand higher temperatures is provided.

Embodiment 2

Figure 7A:
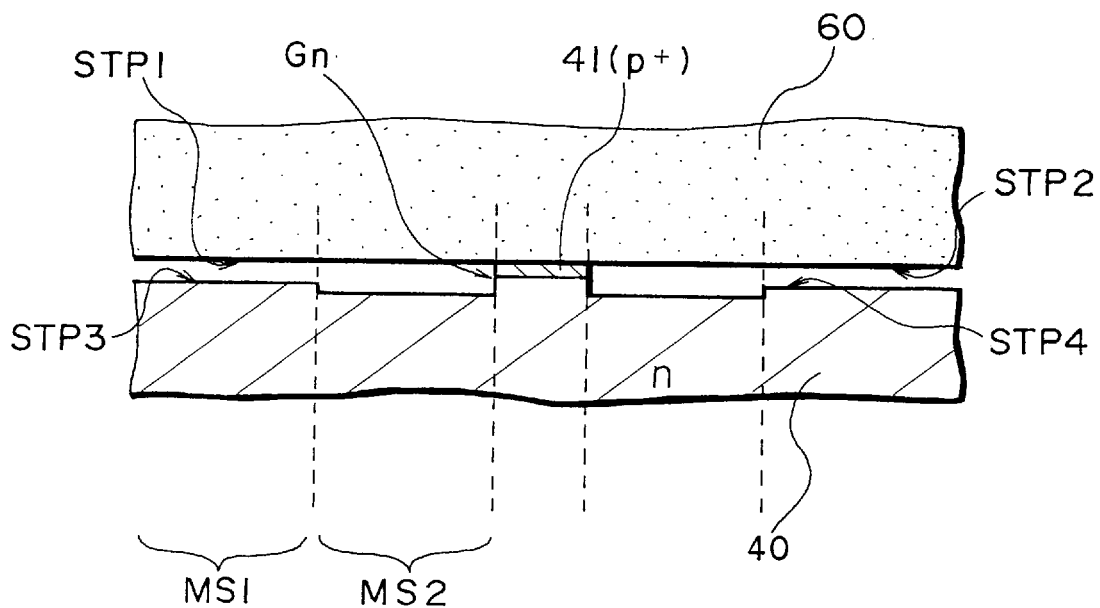
FIG. 7A is a cross-sectional view of the force transducer in a second embodiment of this invention, in a state in which no compression force is applied thereto.
Figure 7B:
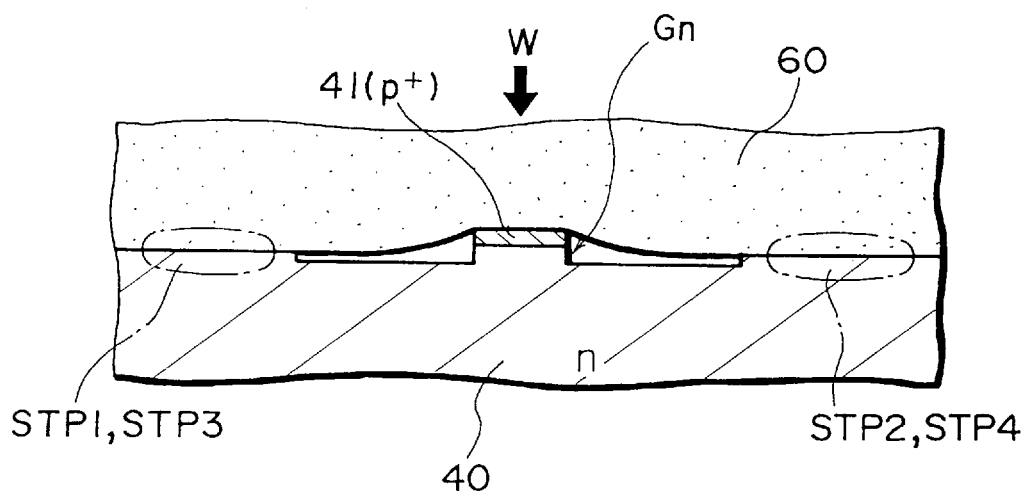
FIG. 7B is a cross-sectional view of this force transducer when the pressure transfer block is deformed by a compression force.

A second embodiment of this invention is shown in FIGS. 7A and 7B.

With this embodiment, two-stage etching is performed on a surface of an n-type single crystal silicon 40 to form a shallow stepped portion MS1 and a deep stepped portion MS2.

In this case, the substrate surface of the shallow stepped portion MS1 functions in the same manner as the stoppers STP3 and STP4 shown in FIGS. 3A and 3B, but the deep stepped portion MS2 does not function as a stopper.

Figure 8:
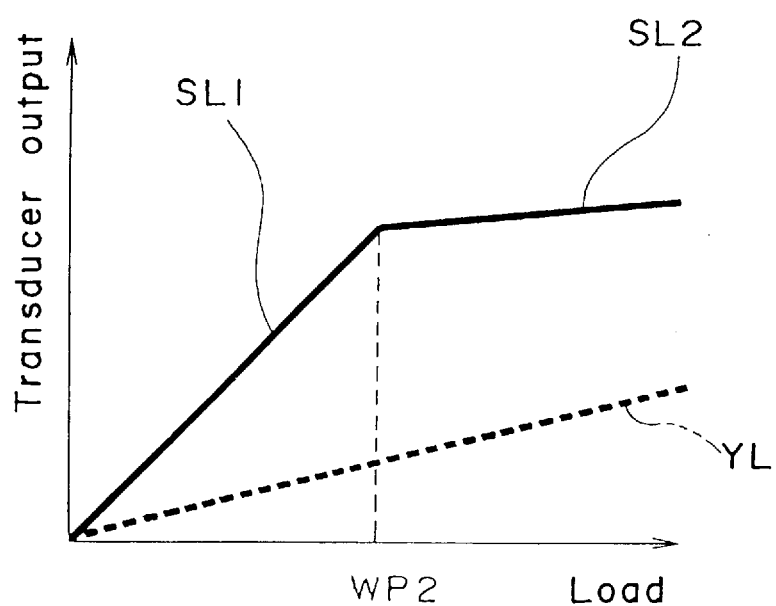
FIG. 8 is a graph of the relationship between load on the force transducer of FIG. 7 and the output voltage thereof.

As a result, warping of the pressure transfer block 60 is generated at the deep stepped portion MS2, as shown in FIG. 7B, so that the shallow stepped portion MS1 rapidly starts to act as a stopper, but there is no subsequent change in the contact area. This improves the linearity of the force detection output, as shown in FIG. 8. In other words, there is little of the fuzziness that can be seen in FIG. 6 during the initial stages of the stopper action, caused by changes in the contact area.

Thus, changes in the contact area rapidly become constant after the pressure transfer block 60 of the configuration of FIG. 7 comes into contact with the stopper region. This improves the linearity of the output in the initial stages after the stopper starts acting, and therefore it is possible to provide a two-stage output (with a high-sensitivity characteristic region SL1 and a low-sensitivity characteristic region SL2, as shown in FIG. 8) that also uses the stopper region as a measurement region. Therefore the measurement range can be greatly increased.

Embodiment 3

Figure 9:
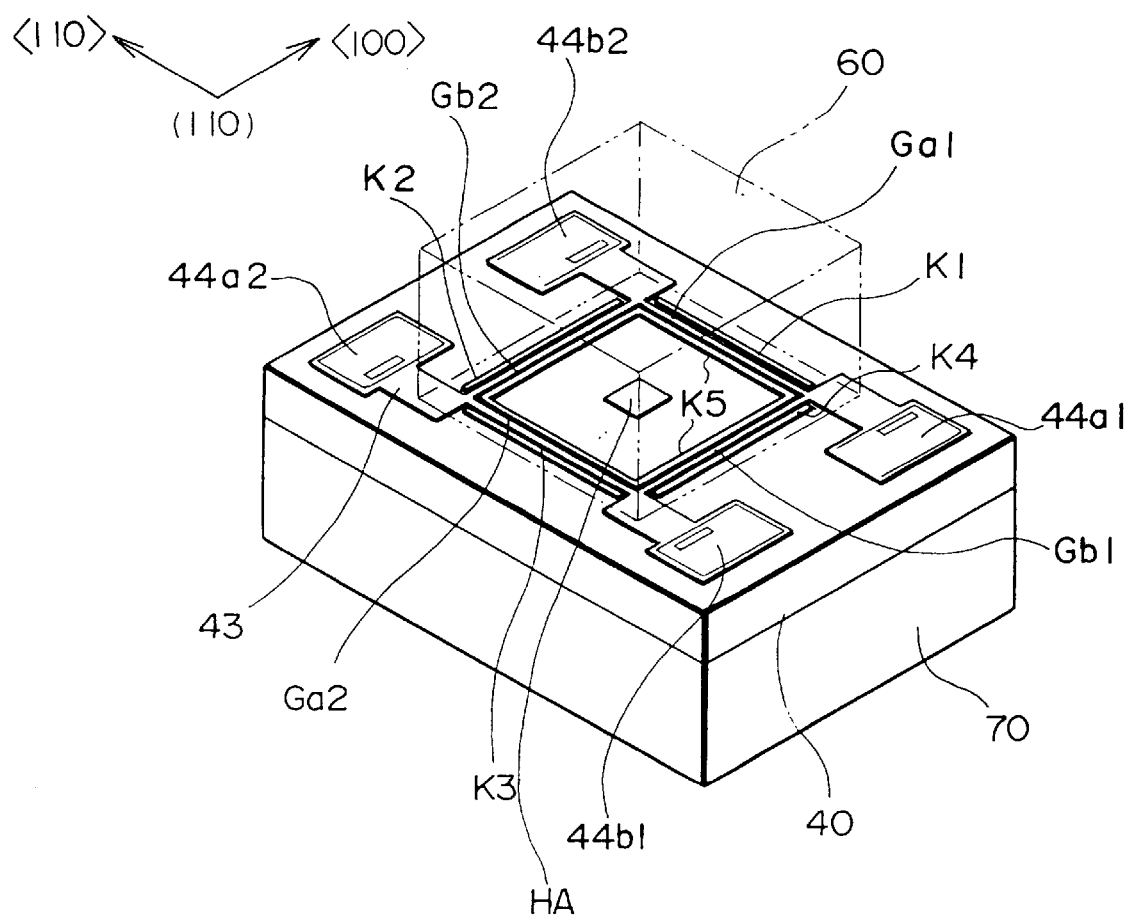
FIG. 9 is a perspective view of the force transducer in a third embodiment of this invention.

The configuration of a third embodiment of this invention is shown in FIG. 9.

A first characteristic feature of this embodiment is the provision of guard banks K1 to K5. In other words, this embodiment is provided with guard banks K1 to K5 on each side of the strain gages Ga1, Ga2, Gb1, and Gb2. These guard banks have the same properties and shapes as the strain gages, but are separated therefrom by a distance that is between one and five times the width of the strain gages and are not connected electrically thereto. They mitigate in-plane stresses acting on the strain gages, and also mitigate stress concentrations at the shoulder portions of the strain gages.

In this case, each "guard bank" always bears compression forces and also any horizontal components of force that might be generated by deformation of the pressure transfer block by these compression forces. They thus reduce any horizontal components of force acting on the strain gages. Therefore, inplane stresses generated by pressure on the corner portions of the strain gages due to deformation of the pressure transfer block under compression are mitigated by these guard bank portions, which enables an improvement in the action of the effective compression strain on the strain gages. This makes it possible to increase the sensitivity of the force transducer and also improve the fracture strength thereof.

A second characteristic feature of this embodiment is the provision of a central protuberant portion HA. In this case, the central protuberant portion always bears compression forces, and mainly acts to restrain deformation of the pressure transfer block. Therefore, change in the pressure-bearing area is kept small and there is no deterioration of the detection sensitivity, making it possible to increase the load at which the pressure transfer block starts to come into contact with the stopper. This expands the high sensitivity region, which is useful for improving design freedom.

In other words, although it is necessary to increase the height of protrusion of the strain gages to expand the high sensitivity region, this height of protrusion is limited to approximately 3 μm by restrictions on the resolution provided by photolithography. However, the provision of the central protuberant portion HA enables a reduction in the magnitude of deformation due to compression force to approximately ¹⁄₁₀. As a result, the compression force at which the pressure transfer block starts to come into contact with the stoppers can be increased by a factor of 10, with virtually no change in the pressure-bearing area in the high sensitivity region, while maintaining the processing accuracy obtained by the use of photolithography.

This is described in specific detail below.

Figure 10:
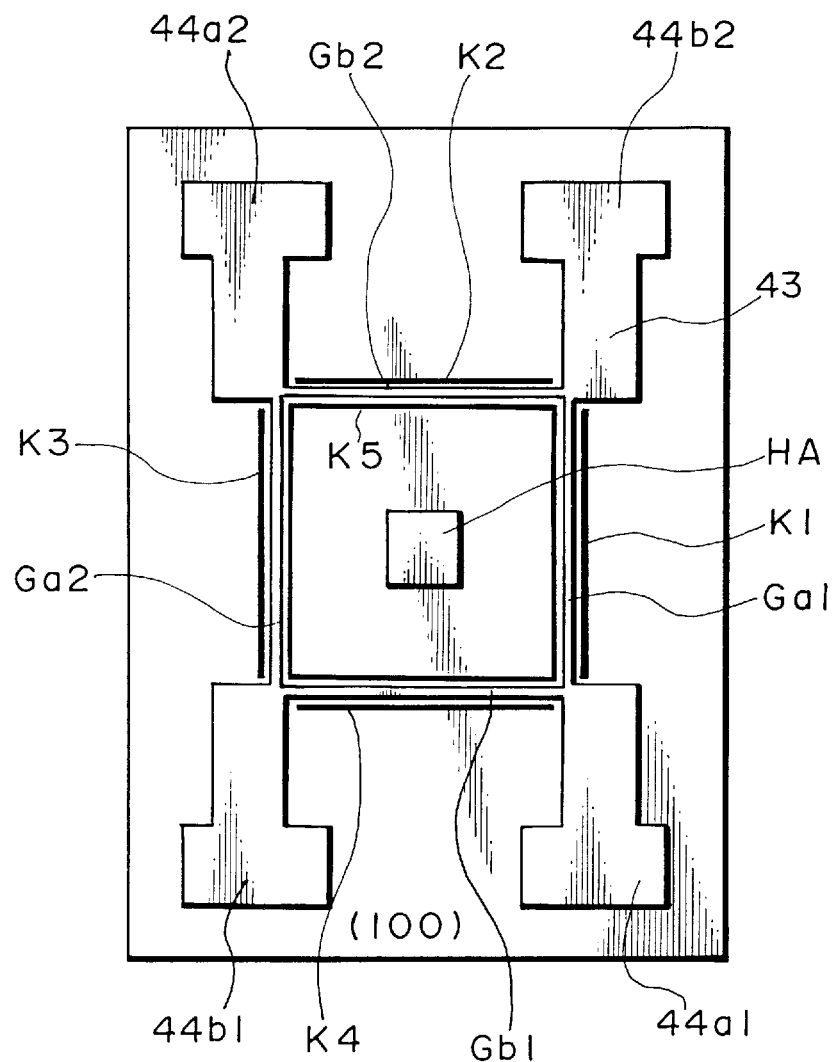
FIG. 10 is a plan view of the plane disposition of components such as the strain gages, guard banks, and central protuberant portion in the force transducer of FIG. 9.

The guard banks K1 to K4 are provided on the outer sides of each of the strain gages Ga1, Gb2, Ga2, and Gb1, respectively, and a single guard bank K5 is provided within the perimeter set by the strain gages Ga1, Gb2, Ga2, and Gb1, as shown in FIG. 10.

The further provision of the central protuberant portion HA of the same properties and height as the strain gages, but separated therefrom electrically, in the vicinity of the center of the silicon single crystal makes it possible to increase the load at which the pressure transfer block starts to come into contact with the stopper. The load-output characteristic of the force transducer during this process is also shown in FIG. 12. A curve D2 is the characteristic in accordance with this embodiment. It is clear from this figure that the compression resistance of this embodiment is much greater than that of the configuration of FIG. 1.

As shown in FIG. 11B, the central protuberant portion HA in the configuration of this embodiment always bears the load of the pressure transfer block 60 and thus controls the deformation thereof. At the same time, the guard banks K1 to K5 bear part of the compression force that is applied to the strain gages, so that the load on the strain gages is less than that in the configuration of FIG. 11A, which further improves the compression resistance shown in FIG. 12.

Embodiment 4

This embodiment of the present invention relates to a method of fabricating the above described semiconductor force transducer. In the fabrication method of this embodiment, mesa etching is performed after an impurity has been diffused into the entire surface of a semiconductor substrate, to form strain gages in a grid form. This enables the fabrication of strain gages having the superior characteristics described above, by a simple process.

First of all, a p-type impurity is diffused into the entire surface of an n-type silicon single crystal substrate 40 to form a p-type diffusion layer 41 having a thickness of approximately 1 µm, as shown in FIG. 15A.

Next, mesa etching to a depth of approximately 3 µm is performed, except for strain gage portions, lead portions, and electrode portions, to form stopper portions, the strain gages Ga1, Ga2, etc., lead portions, and electrode portions in a single process, as shown in FIG. 15B.

This fabrication method enables efficient fabrication of the semiconductor force transducer in accordance with this invention that is shown in FIG. 1 or FIG. 9.

Embodiment 5

This embodiment enables the fabrication of a semiconductor force transducer that can be used at high temperatures of 200° C. or above, by a simple process using a silicon-on-insulator (SOI) substrate. The means for obtaining the SOI-structure silicon substrate could be an epitaxial growth technique, a technique of directly bonding silicon wafers, or a method using the implantation of oxygen ions (SIMOX method), but the SOI substrate of this embodiment is actually formed by the SIMOX method.

First of all, oxygen ions are implanted from the surface of an n-type silicon semiconductor substrate 40, as shown in FIG. 16A, the oxygen ions are activated by thermal processing, so that an insulating layer (denoted by reference number 45 in FIG. 16B) is formed within the surface of the silicon substrate.

Next, boron (B) is diffused into the entire surface to form a high-density p-type layer 41, as shown in FIG. 16B.

The surface of the semiconductor substrate is then subjected to mesa etching to form the strain gages Ga1, Ga2, etc., as shown in FIG. 16C.

With an SOI-structure strain gage, no pn junction is formed and there is no leakage current even at high temperatures, so that this force transducer can be used in environments of 200° C. or above.

Figure 14:
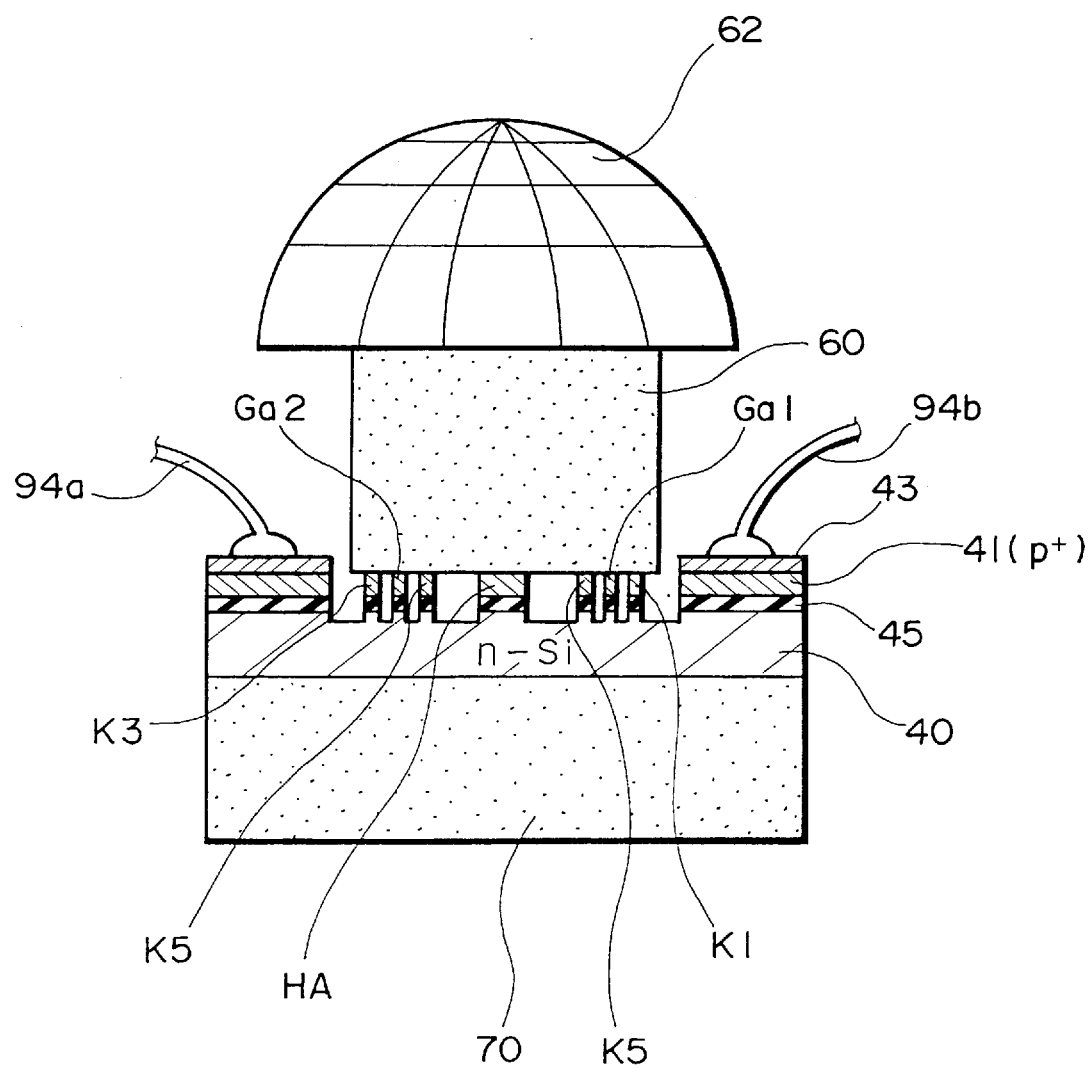
FIG. 14 shows a specific configurational example of essential components of a combustion pressure sensor including a force transducer.

The semiconductor strain gages of the above SOI structure can be used in the assembly shown in FIG. 14.

As shown in this figure, a hemispherical head portion 62 is provided at the top of the pressure transfer block 60. This reduces the contact area between the metal diaphragm 82 and the pressure transfer block 60, as shown in FIG. 13, thus reducing the amount of heat conducted directly from the high-temperature metal diaphragm 82 to the force transducer, making it possible to control the inevitable rise in temperature in the force transducer. Therefore, in addition to the effect of the use of strain gages of an SOI structure, this configuration is suitable for use at high temperatures.

It should be noted that, although this invention was described above by way of various embodiments thereof, the invention should not be taken as being limited by these embodiments and it can be modified in various different ways. For example, the above embodiments were described as examples of the application of this invention to a combustion pressure sensor, but it can equally well be used in a wide range of other fields.

What is claimed is:

1. A force transducer comprising:
    a silicon single crystal substrate having a {110} crystal face as a surface to which a compression force is applied;
    a pressure transfer block for transferring said compression force to said silicon single crystal substrate; and
    strain gages provided on said silicon single crystal substrate;
    wherein said strain gages are formed so as to protrude from said {110} crystal face of said silicon single crystal and constituted as a bridge circuit composed of two pairs of opposing strain gages, electrical resistance of said strain gages being changed by said compression force transferred by said pressure transfer block,
    wherein said pressure transfer block is fixed over said strain gages; and the longitudinal direction of one pair of said opposing strain gages is aligned in a <110> crystal direction and the longitudinal direction of another pair of said opposing strain gages is aligned in a <100> crystal direction; whereby a current flows through input electrodes of said bridge circuit and a voltage output proprtional to said compression force is obtained from output electrodes of said bridge circuit.

2. The force transducer as defined in claim 1 wherein the height of protrusion of said strain gages is such that part of said pressure transfer block at a bottom surface thereof comes into contact with said surface of said silicon crystal when said compression force exceeds a predetermined value and said pressure transfer block is deformed.

3. The force transducer as defined in claim 1 wherein a partially indented portion is provided in said surface of said silicon single crystal in such a manner that, when said compression force exceeds a predetermined value and said pressure transfer block is deformed thereby, said pressure transfer block comes into contact with only said surface of said silicon single crystal without contacting a base portion of said indented portion.

4. The force transducer as defined in claim 1 wherein said strain gages are disposed to constitute sides of a quadrangle having two pairs of parallel sides, and said compression force of said pressure transfer block is applied to all of said strain gages.

5. The force transducer as defined in claim 4 wherein said strain gages constituting the sides of said quadrangle are provided in the vicinity of a neutral surface of in-plane stresses generated by compressing said pressure transfer block.

6. The force transducer as defined in claim 1 wherein a p-type impurity is diffused into at least a surface portion of said strain gages protruding from said surface of said silicon single crystal.

7. The force transducer as defined in claim 7 wherein the density of said p-type impurity is one of the order of $1 \times 10^{18}$ atoms/cm$^3$ and $1 \times 10^{20}$ atoms/cm$^3$.

8. The force transducer as defined in claim 1 wherein guard banks are formed on both sides of each of said strain gages, said guard banks protruding to the same degree as said strain gages and being isolated electrically from said strain gages.

9. The force transducer as defined in claim 1 wherein a central protuberant portion is formed at a center of said surface of said silicon single crystal to support a central potion of said pressure transfer block, said central protuberant portion protruding to the same degree as said strain gages and being isolated electrically from said strain gages.

10. A method of fabricating a force transducer including a silicon single crystal substrate having a {110} crystal face as a surface to which a compression force is applied, and strain gages formed protruding from said {100} crystal face, electrical resistance of said strain gages being changed by said compression force, said method comprising the steps of:

diffusing an impurity of a second conductivity type into the entire surface of a silicon single crystal substrate of a first conductivity type, to form a regoin of said second conductivity type in a surface portion of said silicon single crystal substrate; and etching said surface of said silicon single crystal of said first conductivity type, except for portions that will form said strain gages, to form steps deeper than said region of said second conductivity type, so as to create narrow strain gages having said region of said second conductivity type in a surface layer portion of said silicon single crystal substrate.

11. The method of fabricating a force transducer as defined in claim 10 wherein said silicon single crystal substrate of a first conductivity type is n-type silicon single crystal substrate, and said region of said second conductivity type is p-type region.

12. The method of fabricating a force transducer as defined in claim 10 wherein said silicon single crystal substrate is a silicon-on-insulator (SOI) substrate.

13. A force transducer comprising:

a silicon single crystal substrate having a {110} crystal face as a surface to which a compression force is applied;

a pressure transfer block for transferring said compression force to said silicon single crystal substrate; and strain gages provided on said silicon single crystal substrate;

wherein said strain gages are formed so as to protrude from said {110} crystal face of said silicon single crystal and constituted as a bridge circuit composed of two pairs of opposing strain gages, electrical resistance of said strain gages being changed by said compression force transferred by said pressure transfer block, wherein said strain gages have a piezoresistive coefficient of $\pi_{13}$.

14. The force transducer as defined in claim 13 wherein said pressure transfer block is fixed over said strain gages; and the longitudinal direction of one pair of said opposing strain gages is aligned in a <110> crystal direction and the longitudinal direction of another pair of said opposing strain gages is aligned in a <100> crystal direction;

whereby a current flows through input electrodes of said bridge circuit and a voltage output proportional to said compression force is obtained from output electrodes of said bridge circuit.

15. The force transducer as defined in claim 13, wherein an area of a region surrounded by said strain gages is smaller than an area of a bottom surface of said pressure transfer block which faces said silicon single crystal substrate.

16. The force transducer as defined in claim 13 wherein the height of protrusion of said strain gages is such that part of said pressure transfer block at a bottom surface thereof comes into contact with said surface of said silicon crystal when said compression force exceeds a predetermined value and said pressure transfer block is deformed.

17. The force transducer as defined in claim 13 wherein a partially indented portion is provided in said surface of said silicon single crystal in such a manner that, when said compression force exceeds a predetermined value and said pressure transfer block is deformed thereby, said pressure transfer block comes into contact with only said surface of said silicon single crystal without contacting a base portion of said indented portion.

18. The force transducer as defined in claim 13 wherein said strain gages are disposed to constitute sides of a quadrangle having two pairs of parallel sides, and said compression force of said pressure transfer block is applied to all of said strain gages.

19. The force transducer as defined in claim 18 wherein said strain gages constituting the sides of said quadrangle are provided in the vicinity of a neutral surface of in-plane stresses generated by compressing said pressure transfer block.

20. The force transducer as defined in claim 13 wherein a p-type impurity is diffused into at least a surface portion of said strain gages protruding from said surface of said silicon single crystal.

21. The force transducer as defined in claim 20 wherein the density of said p-type impurity is one of the order of $1 \times 10^{18}$ atoms/cm$^3$ and $1 \times 10^{20}$ atoms/cm$^3$.

22. The force transducer as defined in claim 13 wherein guard banks are formed on both sides of each of said strain gages, said guard banks protruding to the same degree as said strain gages and being isolated electrically from said strain gages.

23. The force transducer as defined in claim 13 wherein a central protuberant portion is formed at a center of said surface of said silicon single crystal to support a central potion of said pressure transfer block, said central protuberant portion protruding to the same degree as said strain gages and being isolated electrically from said strain gages.

* * * * *

UNITED STATES PATENT AND TRADEMARK OFFICE
CERTIFICATE OF CORRECTION

PATENT NO. : 5,773,728
DATED : June 30, 1998
INVENTOR(S) : KOUJI TSUKADA ET AL

It is certified that error appears in the above-identified patent and that said Letters Patent is hereby corrected as shown below:

Column 14, line 60, in claim 7, change "claim 7" to --claim 6--.

Column 15, line 10, in claim 10, change "{100}" to --{110}--.

Signed and Sealed this

Ninth Day of March, 1999

Attest:

Q. TODD DICKINSON

Attesting Officer    Acting Commissioner of Patents and Trademarks